United States Patent Office 2,703,763
Patented Mar. 8, 1955

2,703,763

SOLUTION OF NITROCELLULOSE AND TRIALLYLPENTAERYTHRITOL ETHYL CARBONATE

Stanley F. Marrian, Dunmurry, Northern Ireland, and William Henry Thompson, Ardrossan, Scotland, assignors to Imperial Chemical Industries Limited, a corporation of Great Britain No Drawing. Application June 26, 1952,
Serial No. 295,848

Claims priority, application Great Britain August 31, 1951

7 Claims. (Cl. 106—188)

The present invention is concerned with new and improved liquid nitrocellulose compositions of the kind capable of yielding clear films wherein the nitrocellulose is held in solution in a solvent miscible with triallyl pentaerythritol ethyl carbonate.

We have now found that when liquid forms of the ester triallyl pentaerythritol ether ethyl carbonate are added to a solution of an industrial nitrocellulose in a volatile organic solvent miscible with said ester the nitrocellulose remains in solution, that on evaporation of the volatile organic solvent from thin layers of such solutions there are rapidly obtained clear tack-free films and that on subjecting these films to conditions which will polymerise the said ester the nitrocellulose is retained in solution therein and gives, on polymerisation of said ester, films, coatings and the like of desirable properties.

Triallyl pentaerythritol ether ethyl carbonate is a relatively non-volatile organic liquid of boiling point 100° C. or higher at pressures of the order of 0.05 mm. and is not a solvent for nitrocellulose but is, however, miscible with a wide variety of volatile organic solvents for nitrocellulose.

According to the present invention, liquid nitrocellulose compositions comprise a solution of nitrocellulose and a liquid form of the ester triallyl pentaerythritol ether ethyl carbonate in a volatile organic solvent.

Suitable volatile organic solvents for use in the compositions of the present invention include, for example, methyl ethyl ketone, acetone and ethyl acetate.

The liquid nitrocellulose compositions may contain nitrocellulose in any amount from 1000% to 100% by weight of the triallyl pentaerythritol ether ethyl carbonate but amounts of the order of 100% are preferred as these give the most desirable properties.

The triallyl pentaerythritol ether ethyl carbonate may be used in the monomeric form. It is, however, advantageous to use the ester in a partially polymerised but still liquid form as this increases the speed of drying.

The transformation of the triallyl pentaerythritol ether ethyl carbonate to the resinous solid polymerised form may be brought about by heating without a catalyst or with the addition of a small percentage of a polymerisation catalyst such as benzoyl peroxide, succinyl peroxide, or the like, but is preferably carried out by the addition of a small proportion of a drier such as cobalt linoleate or cobalt naphthenate with subsequent exposure to air.

The liquid nitrocellulose compositions of the present invention may also contain other ingredients, for example, small amounts of non-volatile plasticisers such as blown castor oil.

When it is desired to form compositions according to the present invention which are suitable for spraying, it is often desirable to incorporate a proportion of a high boiling solvent such as, for example, methyl isobutyl ketone or methyl cyclohexanone. The incorporation of such a solvent will, of course, cause some decrease in the drying speed.

A particular advantage of the liquid nitrocellulose compositions of the present invention is that lacquers based on these compositions have a much shorter time of setting to a tack-free condition than the lacquers of the prior art and hence additional coats can be laid on an article without having to wait so long for the previous coat to dry. Thus the lacquers of the present invention set to a tack-free condition in less than 10 minutes and may even set in as little as 2½ minutes.

A liquid nitrocellulose composition according to the invention is illustrated by the following example in which all parts are by weight.

Example

A lacquer is made by mixing the following ingredients together:

| | Parts |
|---|---|
| Nitrocellulose (½ second) (damped with industrial methylated spirits in the ratio of 70:30 by weight of nitrocellulose to spirit) | 14.3 |
| Triallyl pentaerythritol ether ethyl carbonate (in liquid form) | 10.0 |
| Methyl ethyl ketone | 60.0 |
| Methyl cyclohexanone | 0.6 |
| Lead (as naphthenate) | 0.1 |
| Cobalt (as octoate) | 0.01 |
| Blown castor oil | 5.0 |

Films spread from this lacquer set to a tack-free condition in 2 minutes and are print free in 4 minutes and yield a good clear film. A second coat of this lacquer can be applied in 4 minutes whereas using the lacquers hitherto available an interval of at least 15 minutes is necessary between the application of successive coats. This lacquer is suitable for use as a wood finish.

What we claim is:

1. A liquid nitrocellulose composition capable of rapidly drying to form clear tack-free films which can be polymerized while retaining the nitrocellulose in solution which comprises a solution of a nitrocellulose and the ester triallyl pentaerythritol ether ethyl carbonate in liquid form in a low boiling solvent, said nitrocellulose being present in amount of from 10 to about 1 part of nitrocellulose per part of said ester.

2. A liquid nitrocellulose composition as recited in claim 1 in which said liquid ester is triallyl pentaerythritol ether ethyl carbonate monomer.

3. A liquid nitrocellulose composition as recited in claim 1 in which said liquid ester is partially polymerized triallyl pentaerythritol ether ethyl carbonate.

4. A liquid nitrocellulose composition as recited in claim 1 containing a very small proportion of a high boiling solvent.

5. A liquid nitrocellulose composition as recited in claim 1 in which the said low boiling solvent is selected from the group consisting of methyl ethyl ketone, acetone and ethyl acetate.

6. A liquid nitrocellulose composition as recited in claim 1 containing a non-volatile plasticizer.

7. A liquid nitrocellulose composition as recited in claim 1 containing a polymerization catalyst for the said triallyl pentaerythritol ether ethyl carbonate.

References Cited in the file of this patent

UNITED STATES PATENTS

| | | |
|---|---|---|
| 1,556,512 | Farrington et al. | Oct. 26, 1925 |
| 1,665,383 | Taylor et al. | Apr. 10, 1928 |
| 2,100,425 | Bent | Nov. 30, 1937 |
| 2,527,970 | Sokol | Oct. 31, 1950 |
| 2,585,359 | Whetstone et al. | Feb. 12, 1952 |

FOREIGN PATENTS

| | | |
|---|---|---|
| 358,393 | Great Britain | Oct. 8, 1931 |